Nov. 3, 1925.                                              1,560,396
                          P. NAVARRE
         METHOD FOR AUTOMATIC AND RAPID PRODUCTION OF
              CRYSTALLIZED OR PRESERVED FRUITS
                      Filed Oct. 19, 1922
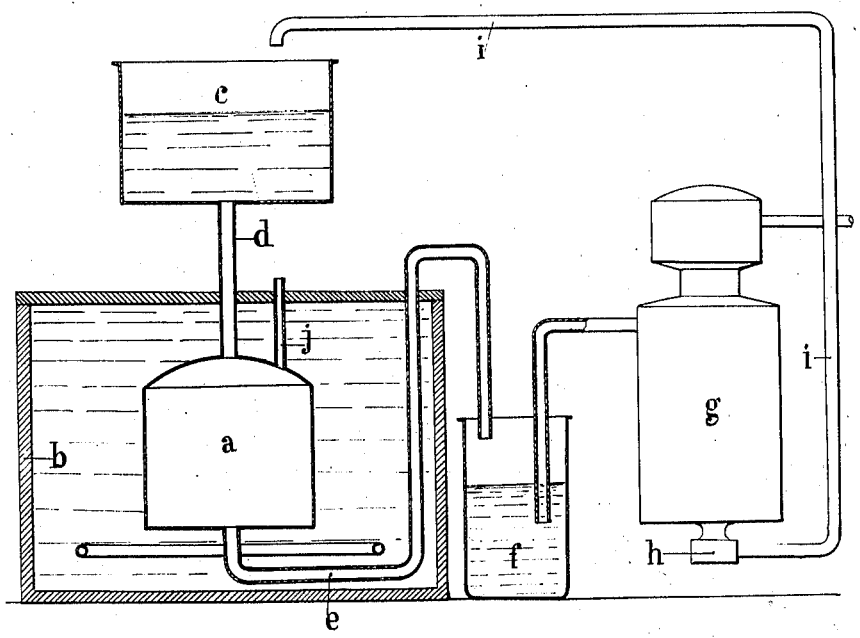
INVENTOR
Placide Navarre
BY
ATTORNEYS Patented Nov. 3, 1925.

1,560,396

UNITED STATES PATENT OFFICE.

PLACIDE NAVARRE, OF PARIS, FRANCE, ASSIGNOR TO SOCIÉTÉ FRAISSE FRERES, OF CAVAILLON, VAUCLUSE, FRANCE, AND SOCIÉTÉ P. NAVARRE & FILS, OF PARIS, FRANCE.

METHOD FOR AUTOMATIC AND RAPID PRODUCTION OF CRYSTALLIZED OR PRESERVED FRUITS.

Application filed October 19, 1922. Serial No. 595,598.

*To all whom it may concern:*

Be it known that I, PLACIDE NAVARRE, engineer, of 56 Avenue de Chatillon, Paris, France, have invented a Method for Automatic and Rapid Production of Crystallized or Preserved Fruits, of which the following is a full, clear, and exact description.

The methods employed up to this day for the production of crystallized or preserved fruits require first the bleaching of the fruits by a slow heating in water the boiling of which must not be prolonged in order to avoid the softening of the said fruits.

For the production proper, successively repeated heating and cooling operations are effected, for obtaining the phenomenon of osmosis between the syrup and the juice of the fruit through the membranes, skin and pulp of the latter.

This treatment by alternate heating and cooling operation is, in fact, used in all the slow or rapid methods known up to this day, whether the old method of multiple manipulations is employed or a method of continuous evaporation or so-called rapid production is used.

In the first case, very small quantities of fruits are treated and which fruits are placed in boiling syrup in pans and transferred in jars where the diffusion takes place during the cooling.

This operation is repeated from 6 to 10 times so that the manufacture requires several weeks.

In the second case, the hot syrup is drawn from the jars containing fruits and syrup, then evaporated in the open air on large surfaces where it cools before falling back on the fruits which, steeping in their syrup, are moreover subjected to successive heating and cooling operations.

Finally, one proceeds also by pouring, on the fruits contained in a vessel, hot syrups which cool by contact with the relatively large mass of the fruits, or again, the vessels containing fruits and syrup are placed in stoves and subjected to sudden heatings and coolings with additions of gradually richer syrup.

Moreover, in all these methods, the phenomenon of osmosis takes place either at atmospheric pressure or under a relative vacuum, at the time of the diffusion in the hot state.

The present invention has for its object a new method of automatic production of crystallized or preserved fruits, for treating large quantities at the time and to obtain in three or four days, without transferring or other handling of the fruits, crystallized or preserved fruits which are immediately marketable.

The method forming the subject-matter of the invention comprises two distinct operations:

1. The fruits to be crystallized and more particularly cherries, and other fruits having a certain firmness are first bleached during several hours in water to which is added a chemical, such as, sulphur dioxide ($SO_2$) permitted by the law and which is constantly maintained at boiling point.

The fruits thus bleached remain rather hard, their colloids are preserved whilst the tannin and malic acid are eliminated, so that these fruits do not present any disagreeable coloration and are not readily crushed.

2. The fruits are then introduced, with a small quantity of syrup, in a vessel hermetically sealed in which the temperature of the said fruits and syrup is maintained rigorously constant for all the duration of the manufacture and in which the syrup circulates in a continuous manner and automatically regenerates in a continuous concentrating apparatus under high vacuum.

This syrup comes from a reservoir in which the level is maintained constant so as to regulate the circulation of the said syrup and to maintain in the vessel or vessels containing the fruits, a predetermined pressure greater than atmospheric pressure.

The temperature at which the mixture of fruits and syrup is maintained during the entire manufacture, promotes the phenomenon of osmosis of which it accelerates the speed and depends, of course, on the nature of the fruits to be crystallized, but it does not vary from the beginning of the manufacture up to the end.

The water of vegetation of the fruit is a sweet solution, less dense than the syrup in which the fruit steeps; its vapour tension is higher, for a determined temperature, than that of the syrup, so that there is super-pressure from the interior towards the exterior of the fruit whereby the fruit together with the skin is expanded with the consequent danger of bursting such skin.

It is for the purpose of avoiding this inconvenience that cooling was used in the old methods.

According to the present invention, an artificial pressure is produced in the hermetically closed vessel containing the fruits to be crystallized by means of the admission under pressure of the syrup in the said vessel.

The balancing of the pressures on each side of the skin of the fruit is thus reestablished, so that it is possible to maintain during several days, without any danger, the temperature most suitable for promoting the penetration of the sugar into the fruit.

The influence of the temperature on the speed and the balancing of the osmotic phenomena is relatively great, whilst the influence of the pressure, when the variation of the latter is of the order of one atmosphere is insignificant.

The artificial pressure, obtained by the above indicated means, ensures, moreover, the evacuation of the air bubbles contained in the fruits freed from their stones.

Finally, in the method forming the subject matter of the invention, the fruits are maintained away from air and light for all the duration of the manufacture, so as to avoid any oxidation and disagreeable coloration capable of altering the quality of the product and of being prejudicial to its presentation.

Although the above statement shows clearly the essential differences existing between the various known methods and that forming the subject-matter of the present invention, this latter method will be described hereafter with reference to the accompanying diagrammatic drawing.

The fruits to be crystallized, previously bleached according to the modus operandi indicated above, are introduced with a small quantity of syrup, in a vessel $a$ maintained at a constant temperature of about 60° C. for all the duration of the manufacture.

This temperature, which may vary according to the nature of the fruit, is obtained by heating the vessel $a$ in a water bath arranged for that purpose in a basin $b$ from which heat cannot escape. This method of heating may, of course, be replaced by any other well known system.

A reservoir $c$ adapted to contain the syrup is placed at a certain distance, one meter for instance, above the vessel $a$ with which it communicates through the tube $d$; the level of the syrup in the reservoir $c$ is maintained constant so as to ensure, within the vessel $a$, a pressure greater than atmospheric pressure and to regulate moreover the speed of circulation of the syrup.

This syrup, which passes therefore downwardly through the mass of fruits contained in the vessel $a$, issues from the latter through the branch $e$ and discharges into the basin $f$ from which it is sucked by the vacuum existing in the concentrating apparatus $g$ in which the syrup is concentrated and reheated to a temperature higher by a few degrees than the constant temperature existing in the vessel $a$.

A pump $h$ discharges the regenerated and reheated syrup and sends it, through the conduit-pipe $i$ into the reservoir $c$ from which it flows away again according to a closed circuit, its temperature being equal to that maintained in the fruits contained in the vessel $a$.

A branch $j$ attached to the vessel $a$ permits the evacuation of the air bubbles enclosed in the fruits and which evolve under the combined action of the heat and of the pressure within the vessel $a$.

During the manufacture, sugar and glucose are added to the syrup in the basin $f$ for progressively reinforcing the density of the syrup and for compensating the losses by evaporation, as it is essential that the quantity of syrup in motion remains the same during the course of the operation.

The above described method permits the production of preserved or crystallized fruits within a period of two or three days at the maximum. Nevertheless the product is of an excellent quality regardless of the limited time for its manufacture.

It has the important advantage of doing away with the dangers of fermentation, of avoiding the manipulation of the fruits in course of manufacture and their crushing, owing to the balancing of the pressures within and outside the said fruits, as has been previously explained.

Finally, this method which ensures the perfect homogeneity in the manufacture, permits the treatment of large quantities of fruits at the same time, 1,000, 2,000 kilograms and more, by causing the syrup to circulate through a series of vessels similar to the vessel $a$.

Claims:

1. A process for the rapid manufacture of conserved fruit which comprises bleaching the fruits in a strong solution of sulphur dioxide and which is maintained at the boiling point, then subjecting the bleached fruits to the action of a sugar syrup at a constant temperature and at a constant pressure all the duration of the process, said constant pressure being greater than atmospheric pressure.

2. A process for the rapid manufacture of conserved fruit which comprises bleaching the fruits in a strong solution of sulphur dioxide and which is maintained at the boiling point, then subjecting the bleached fruits to the action of a sugar syrup at a constant temperature and at a constant pressure all the duration of the process and causing the syrup to circulate in a continuous manner on the fruits, the pressure of the syrup being above atmospheric pressure.

3. A process for the rapid manufacture of conserved fruit which comprises bleaching the fruits in a strong solution of sulphur dioxide and which is maintained at the boiling point, then subjecting the bleached fruits to the action of a sugar syrup at a constant temperature and at a constant pressure all the duration of the process and causing the syrup to circulate in a continuous manner on the fruits, the pressure of the syrup being above atmospheric pressure, and then reconcentrating the syrup continuously at a point during the travel of the syrup.

The foregoing specification of my " Method for automatic and rapid production of crystallized or preserved fruits " signed by me this 4th day of October, 1922.

PLACIDE NAVARRE.